US006455200B1

(12) United States Patent
Prakash et al.

(10) Patent No.: US 6,455,200 B1
(45) Date of Patent: Sep. 24, 2002

(54) FLAME-RETARDANT ADDITIVE FOR LI-ION BATTERIES

(75) Inventors: Jai Prakash, Naperville; Chang Woo Lee, Chicago; Khalil Amine, Downers Grove, all of IL (US)

(73) Assignee: Illinois Institute of Technology, Chicago, IL (US)

( * ) Notice: Subject to any disclaimer, the term of this patent is extended or adjusted under 35 U.S.C. 154(b) by 17 days.

(21) Appl. No.: 09/645,381

(22) Filed: Aug. 24, 2000

Related U.S. Application Data
(60) Provisional application No. 60/152,071, filed on Sep. 2, 1999.

(51) Int. Cl.$^7$ .............................. H01M 4/58; H01M 6/16
(52) U.S. Cl. .................. 429/231.95; 429/339; 429/203; 429/322; 429/338; 429/336; 429/330; 429/328
(58) Field of Search ........................... 429/231.95, 203, 429/322, 338, 339, 336, 330, 328

(56) References Cited

U.S. PATENT DOCUMENTS

| | | | |
|---|---|---|---|
| 3,442,629 A | * 5/1969 | Jaszka et al. ................. 23/357 |
| 5,270,134 A | 12/1993 | Tobishima et al. | |
| 5,506,068 A | 4/1996 | Dan et al. | |
| 5,580,683 A | 12/1996 | Takeuchi et al. | |
| 5,601,949 A | 2/1997 | Fujimoto et al. | |
| 5,716,737 A | 2/1998 | Hasegawa et al. | |
| 5,783,328 A | 7/1998 | Wang | |
| 5,830,600 A | * 11/1998 | Narang et al. ............... 429/192 |
| 5,866,093 A | 2/1999 | Belt et al. | |
| 5,922,494 A | 7/1999 | Barker et al. | |
| 5,928,812 A | 7/1999 | Xue | |

OTHER PUBLICATIONS

Sid Megahed et al.: Lithium–ion rechargeable batteries, *Journal of Power Sources*, 79–99, 1994.

N. Koshiba et al.: Characteristics of Carbon–Lithium Rechargeable Batteries, *Practical Lithium Batteries*, 79–81.

Jong–Sung Hong et al.: Electrochemical–Calorimteric Studies of Lithium–Ion Cells, *Electrochem. Soc.*, 1489–1501, vol. 145, No. 5, May 1998.

J.M. Tarascon et al.: The $Li_{1+x}Mn_2O_4$/C Rocking–Chair System: A Review, *Electrochimica Acta*, 1221–1231, vol. 38, No. 9, 1993.

J.R. Dahn et al.: Rechargeable $LiNiO_2$/Carbon Cells, *J. Electrochem. Soc.*, 2207–2211, vol. 138, No. 8, Aug. 1991.

J.J. Auborn et al.: Lithium Intercalation Cells Without Metallic Lithium, *J. Electrochem. Soc.*, 638–641, vol. 134, No. 3, Mar. 1987.

Katsuaki Hasegawa: Safety Study of Electrolyte Solutions for Lithium Batteries by Accelerating–Rate Calorimtery, *Journal of Power Sources*, 43–44, 523–529, 1993.

B.W. Fitzsimmons et al.: *Phosphorus–Nitrogen Compounds. Part VII. Alkoxy–and Aryloxy–cyclophosphazenes*, 1735–1741, 1964.

George E. Blomgren: Properties, Structure and Conductivity of Organic and Inorganic Electrolytes for Lithium Battery Systems, *Properties of Electrolytes*, 14–41.

J.A.R. Stiles: *Rechargeable Lithium Batteries for Consumer Products Applications*, 126–137.

* cited by examiner

*Primary Examiner*—Patrick Ryan
*Assistant Examiner*—Angela J Martin
(74) *Attorney, Agent, or Firm*—Pauley Petersen Kinne & Erickson

(57) ABSTRACT

A lithium-ion battery having an anode electrode, a cathode electrode and a non-aqueous solvent lithium electrolyte. At least one cyclophosphazene is added to the non-aqueous solvent lithium electrolyte, which cyclophosphazene acts as a flame-retardant material. The non-aqueous solvent lithium electrolyte is preferably a carbonate-based electrolyte and the preferred cyclophosphazene is hexamethoxycyclotriphosphazene.

16 Claims, 4 Drawing Sheets

FLAME-RETARDANT ADDITIVE FOR LI-ION BATTERIES

This application claims priority from U.S. Provisional Patent Application Serial No. 60/152,071 filed Sep. 2, 1999.

BACKGROUND OF THE INVENTION

1. Field of the Invention

This invention relates to the use of cyclophosphazene as a flame-retardant additive to the electrolyte of a lithium-ion battery, which material acts as a flame-retardant that reduces both the exothermic peaks and the maximum self-heat rate of the lithium-ion battery by increasing the thermostability of the electrolyte. Applications of this invention are in consumer batteries having carbonate-based electrolytes.

2. Description of Prior Art

Lithium-ion batteries possess high energy density compared to other secondary batteries. Small lithium-ion batteries having a capacity of 1300–1900 mAh are currently commercially available to power portable electronic devices such as camcorders, computers, cameras, etc. In addition, lithium-ion batteries are being developed as power sources for electric vehicles to provide longer drive ranges, higher accelerations and longer lifetimes. However, safety concerns have limited the full utilization of lithium-ion batteries in electric vehicle applications.

The primary challenge in designing an electric vehicle lithium-ion battery is its safety under abusive, as well as normal, operating conditions. Under abusive conditions, and occasionally even under normal conditions, lithium-ion cells undergo thermal runaway, producing exceedingly high temperatures, smoke, explosion and fire. In addition, under certain conditions, the flashpoint of the electrolyte can be exceeded and the lithium-ion battery can be overheated, thereby resulting in major safety problems.

Manufacturers employ external safety devices in small consumer lithium-ion batteries to overcome these problems. These devices include a smart charge control, poly-thermal switch which is responsive to a temperature rise in the cell, and a current path interrupter which is responsible to a rise in internal pressure. Use of these devices in batteries for electric vehicles is, however, not cost-effective. These critical limitations remain the main concern and drawback for scale-up of lithium-ion cells to the large sizes desirable for high-power application in electric vehicle propulsion systems. Thus, non-flammability of the electrolyte is an essential property for the safe design and operation of electric vehicle batteries.

One approach to this problem is the use of fire-retardant electrolyte compositions. U.S. Pat. No. 5,830,600 teaches a lithium battery comprising a fire-retardant electrolyte composition comprising a lithium salt dissolved in a solvent selected from the group consisting of a phosphate, a phospholane, a cyclophosphazene, a silane, a fluorinated carbonate, a fluorinated polyether, and mixtures thereof. That is, the electrolyte of the lithium battery of the '600 patent is a phosphate-based electrolyte and, because phosphorous itself is a flame retardant material, it would appear as if the flame-retardant properties of this lithium battery are due to the presence of phorphorous in the electrolyte. The '600 patent further indicates that electrolyte solvents, such a propylene carbonate, ethylene carbonate, diethyl carbonate and the like, although providing high conductivities in the presence of suitable lithium salts, are chemically unstable and, thus, unsafe.

SUMMARY OF THE INVENTION

It is one object of this invention to provide a flame-retardant lithium-ion battery comprising a non-aqueous solvent lithium-based electrolyte.

It is another object of this invention to provide a flame-retardant lithium-ion battery comprising a carbonate solvent lithium-based electrolyte.

These and other objects of this invention are addressed by a lithium-ion battery comprising an anode electrode, a cathode electrode, and a non-aqueous solvent lithium electrolyte, and a flame-retardant additive comprising at least one cyclophosphazene disposed in the non-aqueous solvent lithium electrolyte. In accordance with a preferred embodiment of this invention, the non-aqueous solvent lithium electrolyte comprises at least one carbonate solvent. As discussed hereinabove, U.S. Pat. No. 5,830,600 indicates that electrolyte solvents such as propylene carbonate, ethylene carbonate, diethyl carbonate and the like, which solvents form the basis of the flame-retardant lithium-ion battery of this invention, although providing high conductivities in the presence of suitable lithium salts, are chemically unstable and, thus, unsafe. Accordingly, it is indeed surprising and unexpected that the flame-retardant lithium-ion battery of this invention having a non-aqueous solvent lithium electrolyte comprising at least one carbonate solvent is stable and safe. As discussed in more detail hereinbelow, the flame-retardant additive incorporated into the non-aqueous solvent lithium electrolyte of the lithium-ion battery of this invention provides a considerable reduction in the exothermic peaks of the battery and the maximum self-heat rate of the battery is reduced by three times. Moreover, the addition of this flame-retardant additive greatly increases the thermostability of the electrolyte.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The lithium-ion battery of this invention comprises an anode electrode, a cathode electrode, and a non-aqueous solvent lithium electrolyte. A flame-retardant additive comprising at least one cyclophosphazene is disposed in the non-aqueous solvent lithium electrolyte. In accordance with one preferred embodiment of this invention, the flame-retardant additive comprises greater than about 1.0% by weight of said electrolyte, preferably in the range of about 1.0% to about 15% by weight of said electrolyte.

To demonstrate the concept of this invention, the electrochemical and thermal properties of non-aqueous electrolytes containing a flame-retardant additive (hexamethoxycyclotriphosphazene[NP(OCH$_3$)$_2$]$_3$) were measured using a potentiostat, cycler and accelerating rate calorimeter. The flame-retardant additive was synthesized by reacting sodium methoxide (NaOCH$_3$) and hexachlorocyclotriphosphazene (NPCl$_2$)$_3$ The electrochemical stability of the electrolyte was determined using cyclic voltamrnetry. Two different electrodes were used as a working electrode and lithium (Li) metal was used as both the counter and reference electrode. A basic mixture of 1M lithium hexafluorophosphate (LiPF$_6$) with ethylene carbonate-dimethyl carbonate in a 50:50 weight percent ratio was used as the electrolyte. Li/LiNi$_{0.8}$Co$_{0.2}$O$_2$ cells were fabricated to study the electrochemical cycling performance. These experiments were performed with a potentiostat (CH Instruments) coupled to a Model 660A electrochemical work station. Cyclic voltammetry was carried out in a glass cell, which had two separate compartments for the working electrode and for the counter and reference electrodes. A platinum disk (2.0 mm diameter) at 0.0 to 2.2 V and a glassy carbon disk (3.0 mm diameter) at 2.0 to 5.2 V were used as working electrodes.

Figure 1:
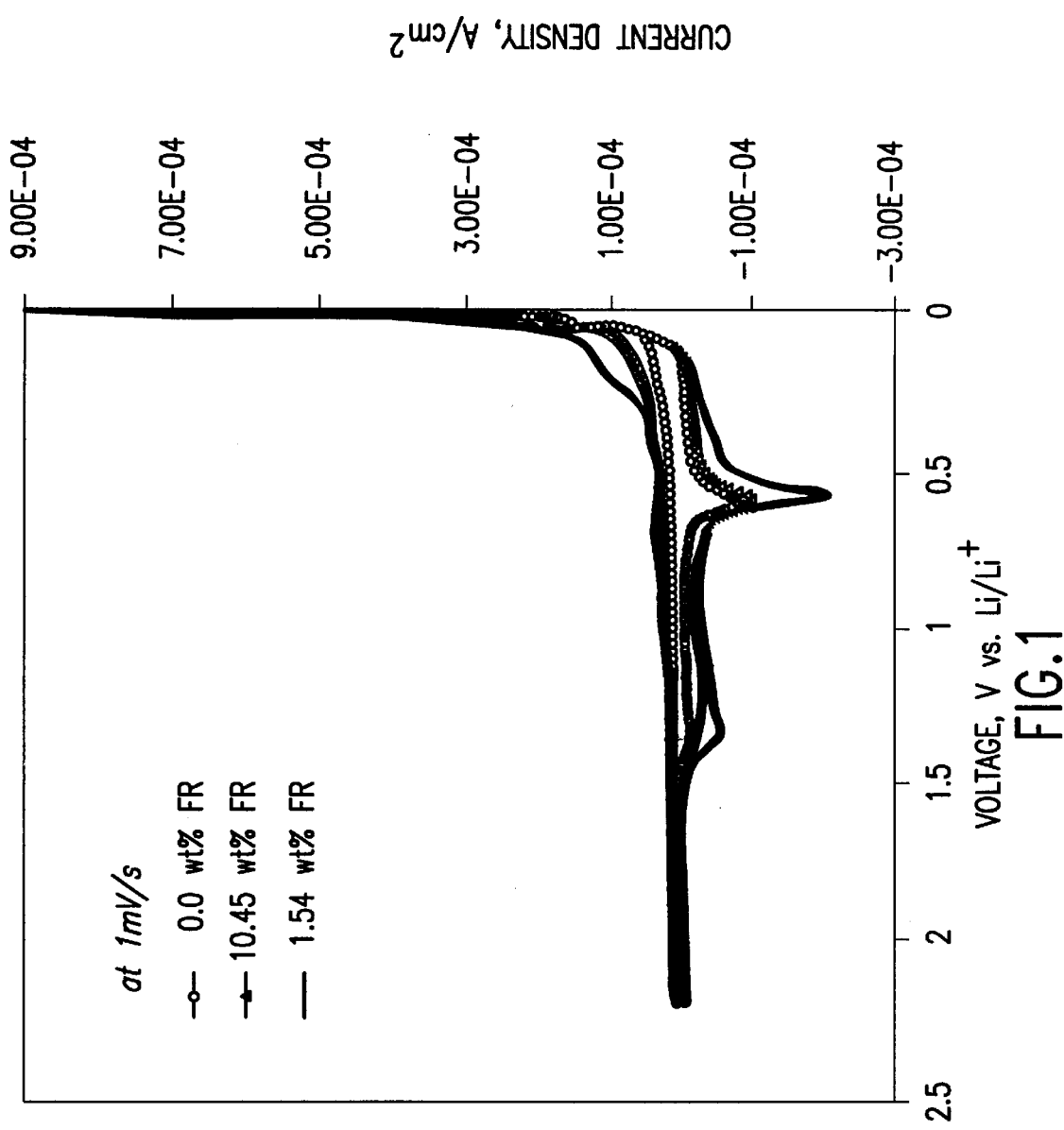
FIG. 1 is a diagram showing cyclic voltammograms of a platinum disk electrode in an electrolyte with and without the flame-retardant additive of this invention.

FIG. 1 shows cyclovoltammograms of a platinum disk electrode in the electrolyte having a 1.54 weight percent flame-retardant additive, a 10.45 weight percent flame-retardant additive and no flame-retardant additive. It was observed that lithium metal was electroplated on the surface of the platinum disk electrode as the potential approached 0 V in the three cyclic voltammograms. It was considered that the peak at about 0 V is associated with lithium deposition. It was also observed that the stripping peak for lithium metal occurred at about 0.6 V. In addition, FIG. 1 shows that the current density was similar with and without the flame-retardant additive. These results indicate that the electrolyte is electrochemically stable with and without the flame-retardant additive in the electrolyte.

Figure 2:
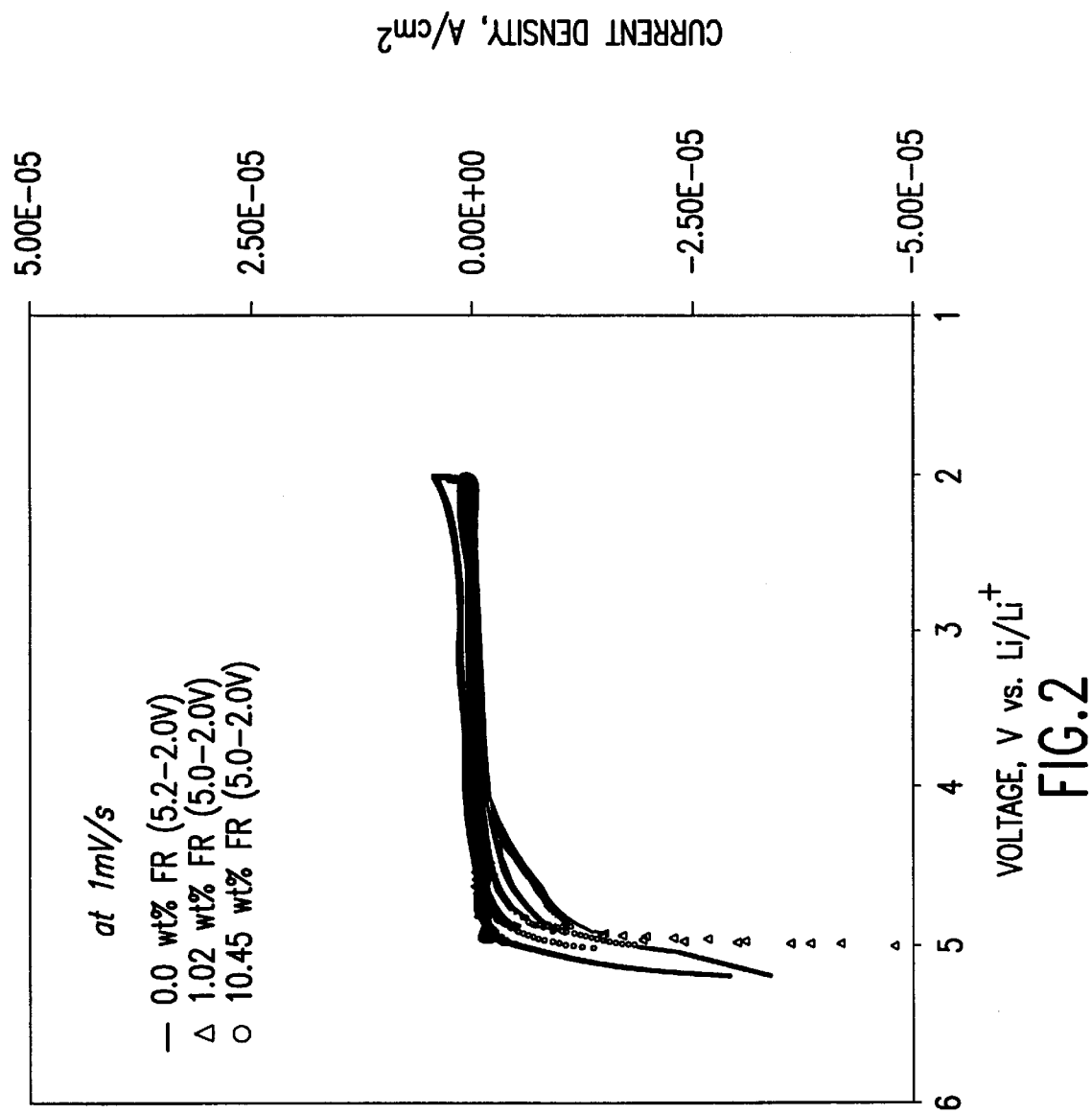
FIG. 2 is a diagram showing the cyclic voltammograms on a glassy carbon disk electrode in an electrolyte with and without the flame-retardant additive of this invention.

FIG. 2 shows the cyclic voltammograms on a glassy carbon disk electrode without the presence of the flame-retardant additive in the electrolyte at 2.0 to 5.2 voltage and with the 1.54 weight percent and 10.45 weight percent flame-retardant additive at 2.0 to 5.0 voltage. In the absence of the flame-retardant additive, the electrolyte was electrochemically stable up to 5.0 V. Comparable electrochemical stability was observed in the electrolyte containing the flame-retardant additive. Thus, it was demonstrated that decomposition of the electrolyte occurred at higher than 5.0 V.

The Li/LiNi$_{0.8}$Co$_{0.2}$O$_2$ cells used to determine the effect of the flame-retardant additive on the electrochemical performance were fabricated with and without the flame-retardant additive present in the electrolyte. These cells were galvanostatically cycled to a cutoff voltage for charge and discharge of 4.2 V and 3.0 V, respectively. The charge and discharge capacities were obtained using a cycler (ABTS 4.0, Arbin). The cell preparation and the electrochemical investigation were carried out in a dry glove box.

Figure 3:
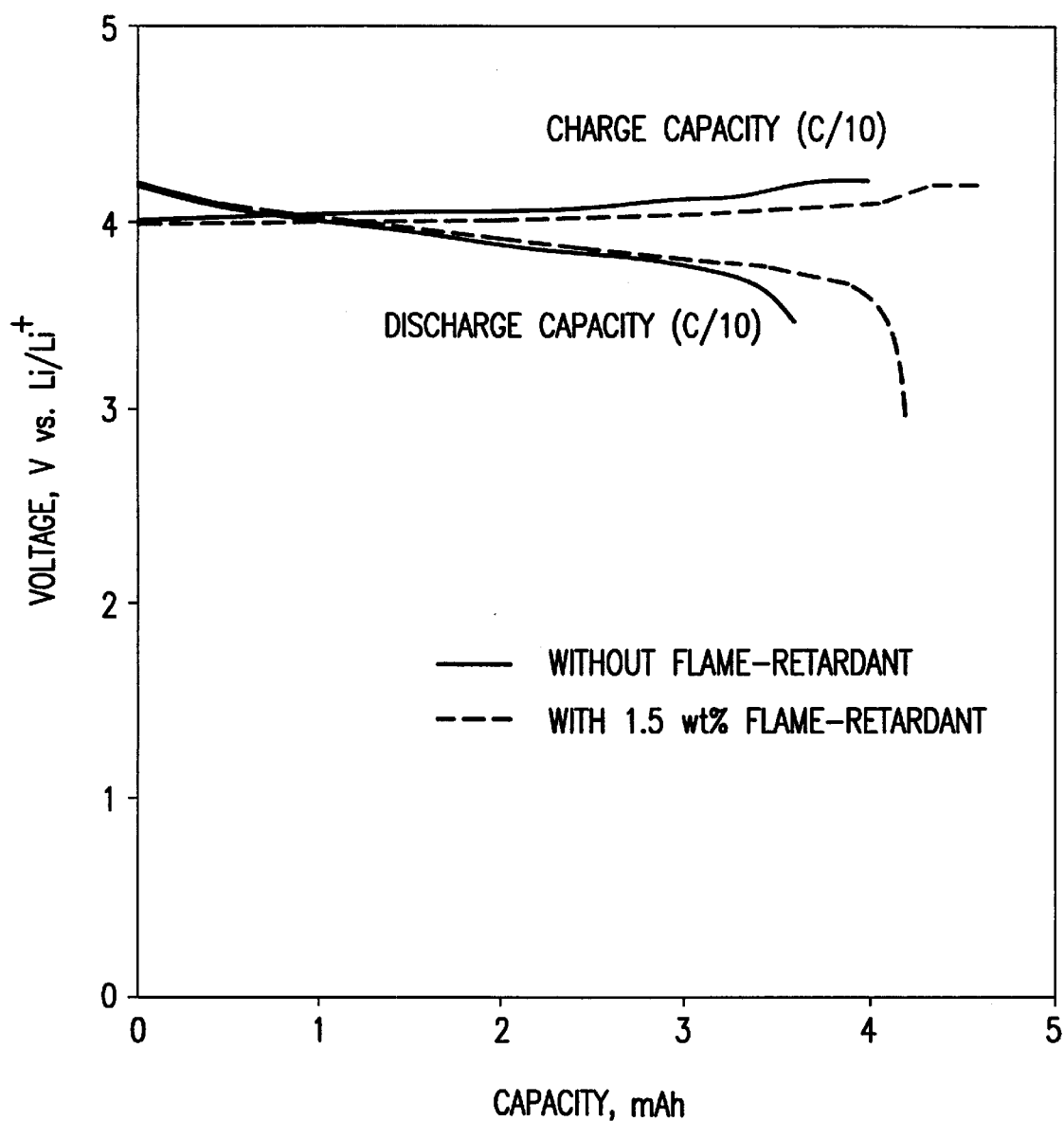
FIG. 3 shows the electrochemical performance of Li/LiNi$_{0.8}$Co$_{0.2}$O$_2$ cells in the presence and absence. of the flame-retardant additive in the electrolyte.

FIG. 3 shows the electrochemical performance of Li/LiNi$_{0.8}$Co$_{0.2}$O$_2$ cells in the presence and absence of the flame-retardant additive in the electrolyte. The capacity of the cells was determined under the same current and the charge and discharge capacities of the cell containing the 1.5 weight percent flame-retardant additive increased significantly compared with the cell having no flame-retardant additive.

The thermostability of the electrolyte with and without the flame-retardant additive was tested using an accelerating rate calorimeter (ARC 2000™, Arthur D. Little, Inc.). Spherical bonds of ½-inch diameter with SWAGELOK® nuts and ferrules were used for these tests. Two samples were prepared, one containing three grams of electrolyte and 10 milligrams of lithium metal and the other containing three grams of the electrolyte, 10 milligrams of lithium and 300 milligrams of the flame-retardant additive. After preparing the samples in a dry glove box, the bonds were hermetically sealed and then transferred into the accelerating rate calorimeter. The calorimeter was programmed in heat wait search (HWS) mode to provide a step increase of 10° C. and the starting and ending temperatures were 30° C. and 270° C., respectively. The wait time was set at 40 minutes.

Figure 4:
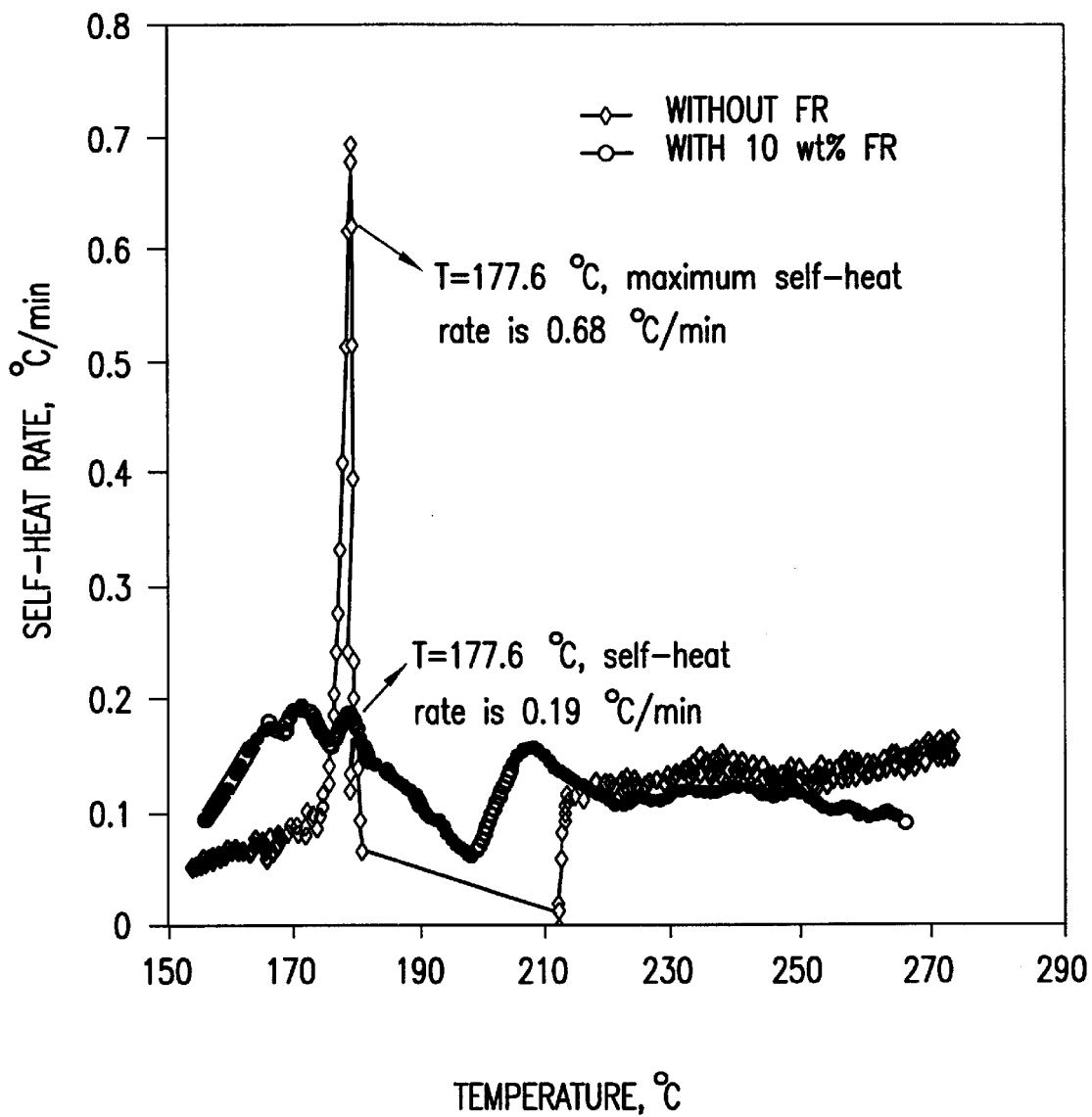
FIG. 4 is a diagram showing the self-heat rate profile of the lithium electrolyte of a lithium-ion battery with and without the flame-retardant additive in an accelerating rate calorimeter (ARC 2000™ Arthur D. Little, Inc.).

FIG. 4 shows the self-heat rate profile of the electrolyte with and without the flame-retardant additive in the accelerating rate calorimeter. It was evident that the maximum self-heat rate of the electrolyte without the flame-retardant additive is 0.68° C./min, which occurs at T=177.6° C. This is attributed to the reaction of lithium metal with the electrolyte. As the reaction proceeded, the lithium metal was consumed and, thus, the exothermic peaks decreased as the temperature increased beyond 177.6° C. On the other hand, the maximum self-heat of the electrolyte with the flame-retardant additive was only 0.1957° C./min at T=170.2° C. The peaks were suppressed in comparison with those for the electrolyte without the flame-retardant additive, which may be attributed to a passivating layer that is formed on the surface of the lithium metal by the flame-retardant additive. The three exothermic peaks may be associated to the different temperatures at which the components constituting the flame-retardant additive react with the lithium metal to form the passivating layer.

Based upon the results of the tests conducted as discussed hereinabove, it is clear that the addition of cyclophosphazene as a flame-retardant additive to the non-aqueous, carbonate based electrolyte of a lithium-ion battery greatly increases the thermostability of the electrolyte. The experiments further establish that hexamethoxycyclotriphosphazene is suitable for use as a flame-retardant additive in terms of the electrochemical stability, performance and thermal properties of the electrolyte.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A lithium-ion battery comprising:
   an anode electrode, a cathode electrode, and an electrolyte having a non-aqueous solvent and lithium; and
   a flame-retardant additive comprising at least one non-halogenated cyclophosphazene disposed in said non-aqueous solvent lithium electrolyte.

2. A lithium-ion battery in accordance with claim 1, wherein said non-aqueous solvent comprises at least one carbonate solvent and comprises less than fifty percent phosphorus-containing nonaqueous solvents.

3. A lithium-ion battery in accordance with claim 2, wherein said electrolyte comprises a carbonate solvent selected from the group consisting of ethylene carbonate, dimethyl carbonate and mixtures thereof.

4. A lithium-ion battery in accordance with claim 1, wherein said flame-retardant additive comprises greater than about 1.0% by weight of said electrolyte.

5. A lithium-ion battery in accordance with claim 1, wherein said non-halogenated cyclophosphazene is hexamethoxycyclotriphosphazene.

6. A lithium-ion battery in accordance with claim 4, wherein said flame-retardant additive comprises in the range of about 1% to about 15% by weight of said electrolyte.

7. In a lithium-ion battery comprising an anode electrode, a cathode electrode and a lithium electrolyte solution disposed therebetween, the improvement comprising:

said lithium electrolyte solution comprising a carbonate non-aqueous solvent and comprising less than fifty percent phosphorus-containing solvents;

and a flame-retardant additive.

8. A lithium-ion battery in accordance with claim 7, wherein said carbonate non-aqueous solvent is selected from the group consisting of ethylene carbonate, dimethyl carbonate and mixtures thereof.

9. A lithium-ion battery in accordance with claim 8, wherein said flame-retardant additive comprises at least one non-halogenated cyclophosphazene and comprises in a range of about 1% to about 15% by weight of said lithium electrolyte solution.

10. A lithium-ion battery in accordance with claim 9, wherein said non-halogenated cyclophosphazene is hexamethoxycyclotriphosphazene.

11. In a lithium-ion battery comprising an anode electrode, a cathode electrode and a lithium electrolyte solution, a method for increasing the fire-resistance of said battery comprising the steps of:

forming said lithium electrolyte solution using a non-aqueous solvent comprising less than fifty percent phosphorus-containing solvents; and mixing a flame-retardant additive comprising at least one non-halogenated cyclophosphazene into said lithium electrolyte solution.

12. A method in accordance with claim 11, wherein said non-aqueous solvent comprises at least one carbonate.

13. A method in accordance with claim 12, wherein said at least one carbonate is selected from the group consisting of ethylene carbonate, dimethyl carbonate and mixtures thereof.

14. A method in accordance with claim 12, wherein said flame-retardant additive comprises in a range of about 1% to about 15% by weight of said lithium electrolyte solution.

15. A method in accordance with claim 11, wherein said at least one non-halogenated cyclophosphazene is hexamethoxycyclotriphosphazene.

16. A lithium-ion battery in accordance with claim 5, wherein said flame-retardant additive comprises in the range of about 1% to about 15% by weight of said nonaqueous solvent.

* * * * *